United States Patent [19]

Wood

[11] 4,118,989

[45] Oct. 10, 1978

[54] LOCKING MECHANISM

[75] Inventor: Ralph R. Wood, Florissant, Mo.

[73] Assignee: Wyle Laboratories, El Segundo, Calif.

[21] Appl. No.: 770,916

[22] Filed: Feb. 22, 1977

[51] Int. Cl.² .................................................. G01M 1/02
[52] U.S. Cl. ....................... 73/487; 144/288 A; 269/48.1
[58] Field of Search .............. 73/487, 485; 144/288 A; 269/48.1; 403/314, DIG. 4

[56] References Cited

U.S. PATENT DOCUMENTS

| 2,615,413 | 10/1952 | Adams et al. | 269/48.1 X |
| 3,761,008 | 9/1973 | Goulder | 269/48.1 X |
| 3,794,369 | 2/1974 | Hnatko | 269/48.1 X |
| 3,889,542 | 6/1975 | Carrigan | 73/487 X |

OTHER PUBLICATIONS

Western Electric – Technical Digest, No. 14, Apr. 1969, pp. 17-18, "Quick Acting Expandable Arbor".

Primary Examiner—James J. Gill
Attorney, Agent, or Firm—Fay & Sharpe

[57] ABSTRACT

A locking mechanism for releasably locking a wheel to a rotatable hollow shaft having a terminal end includes expandable segments located axially outwardly of the shaft terminal end, and an expanding rod extending through the shaft and segments. Axial movement of the rod relative to the shaft and segments selectively expands the segments outwardly into releasable locking engagement with a sleeve positioned over the segments.

17 Claims, 6 Drawing Figures

LOCKING MECHANISM

BACKGROUND OF THE INVENTION

This application relates to the art of locking mechanisms and, more particularly, to releasable locking mechanisms for releasably locking devices to a shaft.

The invention is particularly applicable for use in an apparatus for rotating a wheel in order to balance same and will be described with reference thereto. However, it will be appreciated that the invention has broader applications and may be adapted for and used in other apparatus and environments.

Known locking mechanisms between telescoped tubes include expandable segments carried by one tube for outward expansion into locking engagement with the other tube for preventing relative axial movement between the tubes. Contraction of the segments takes place simply by removing the expanding force. For certain purposes, it would be desirable to provide a locking mechanism of this type which was capable of some axial movement subsequent to outward expansion. It is also desirable to provide a locking mechanism of this type with contracting means which acts positively to move and hold the segments inwardly.

SUMMARY OF THE INVENTION

A locking mechanism associated with a hollow shaft having a terminal end includes expandable means carried by the shaft axially outwardly of the shaft terminal end for movement relative to the shaft radially and axially. Expanding means is carried by the shaft for axial movement relative to the shaft and to the expandable means for outwardly expanding the expandable means. The expanding means and expandable means are movable in unison axially of the shaft for locating a device held by the expandable means in a desired axial position relative to the shaft.

In a preferred arrangement, the expandable means is yieldably biased in one direction axially away from the shaft terminal end, and the expanding means moves opposite to the one direction relative to the expandable means for expanding same.

The expandable means may include a plurality of locking segments and the expanding means may include an elongated rod extending through the shaft. Cooperating means is provided between the segments upon axial movement of the rod in one axial direction relative to the shaft and segments.

The locking mechanism includes contracting means for positively moving the expandable means radially inwardly upon movement of the expanding means in a contracting direction. The expandable means is releasably held in a contracted released position until the expanding means is axially moved in an expanding direction.

Selectively operable control means is provided for selectively moving the expanding means axially in opposite directions to expand and contract the expandable means.

In one apparatus with which the locking mechanism is used, the shaft is rotatably driven and includes friction drive means adjacent the terminal end thereof for frictionally engaging a device held to the shaft by the expandable means for rotatably driving the device with the shaft. The device held to the shaft may comprise a sleeve received over the shaft and expandable means. The sleeve may have a substantially conical outer surface which decreases in diameter in a direction along the shaft from the terminal end. The sleeve is positioned through the central opening in a wheel prior to placement of the sleeve over the expandable means and shaft. Operation of the expanding means moves the expandable means outwardly into engagement with the sleeve and pulls same axially along the shaft until the wheel engages the friction drive means.

It is a principal object of the present invention to provide an improved releasable locking mechanism.

It is a further object of the invention to provide an improved locking mechanism having expandable segments which are capable of limited axial movement after outward expansion thereof.

It is also an object of the invention to provide a locking mechanism having expandable segments and including contracting means for positively moving the segments radially inwardly.

It is an additional object of the invention to provide an improved locking mechanism for releasably locking a wheel to a rotatable shaft in a wheel balancer apparatus.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 5 is an end elevational view taken generally along lines 5—5 of FIG. 1; and, FIG. 6 is a cross-sectional elevational view taken generally along lines 6—6 of FIG. 5.

DESCRIPTION OF THE PREFERRED EMBODIMENT

Figure 1:
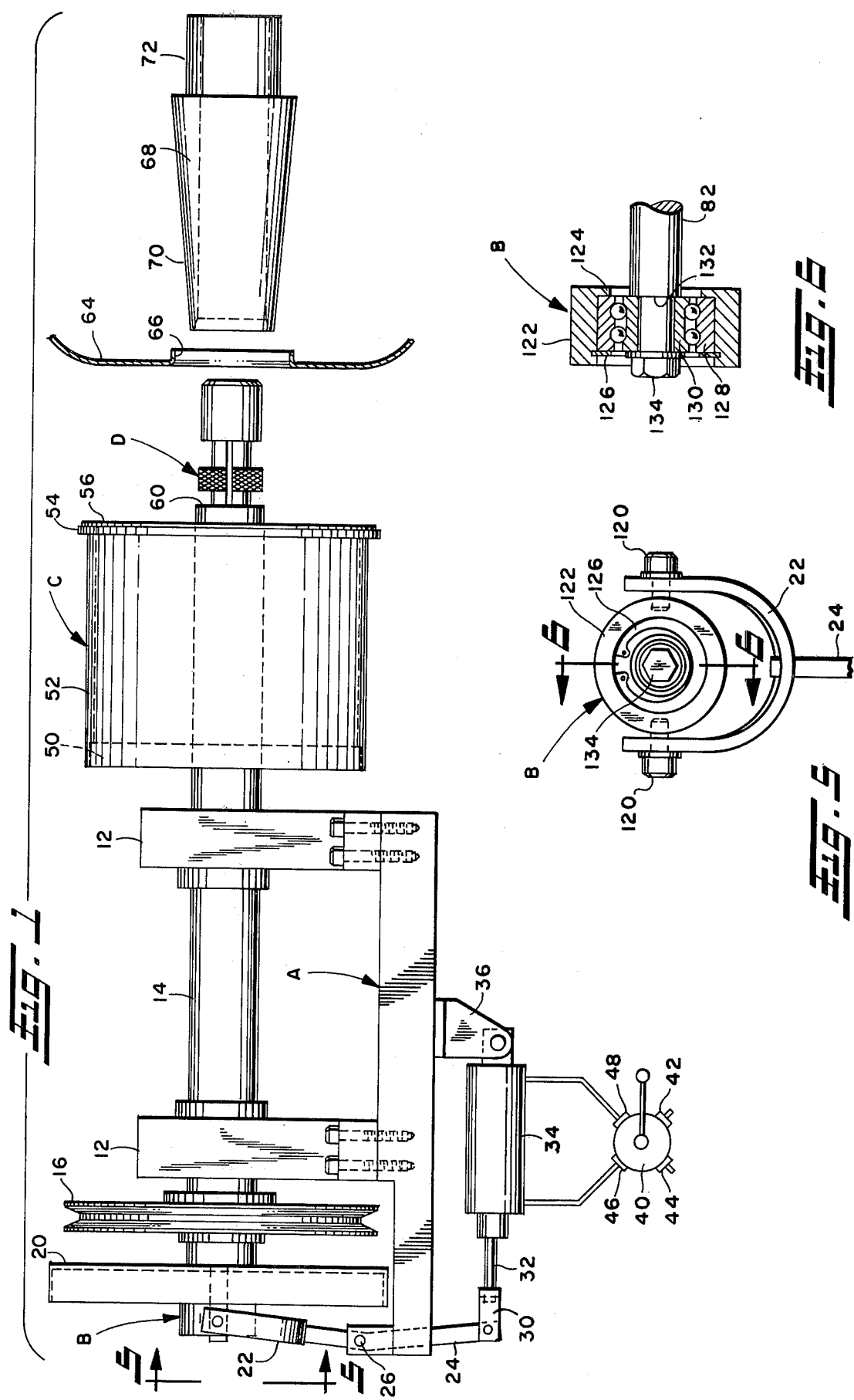
FIG. 1 is a side elevational view of a wheel balancer apparatus having the improved locking mechanism of the present application incorporated therein.

Referring now to the drawings wherein the showings are for purposes of illustrating the preferred embodiment of the invention only and not for purposes of limiting same, FIG. 1 shows a wheel balancer apparatus or the like including a support frame A having a pair of spaced bearings 12 rotatably supporting an elongated hollow shaft 14. A pulley 16 secured to shaft 14 is adapted to be drivingly connected with a suitable motor by a suitable belt for rotatably driving shaft 14.

A disc member 20 secured to shaft 14 provides a reference for indicating the position of a shiftable bearing assembly B connected by a yoke 22 with a lever 24 pivoted at 26 to frame A. A bracket 30 pivotally connected with lever 24 is attached to rod 32 of pneumatic cylinder 34 suitably connected to frame A as by bracket 36. A suitable directional valve 40 has a supply port 42 connected with a suitable source of pneumatic pressure and an exhaust port 44 open to atmosphere. Ports 46 and 48 are connected with opposite ends of cylinder 34. In one position of directional valve 40, ports 42 and 48 are in communication as are ports 44 and 46. This will extend cylinder rod 32 to the extended position shown in FIG. 1. In the other position of directional valve 40, ports 42 and 46 are in communication as are ports 44 and 48. This will retract cylinder rod 32 to the right in FIG. 1. Directional valve 40 effectively defines selectively operable control means for selectively moving bearing assembly B axially to the right and left in FIG. 1. This also operates the locking mechanism of the present application for moving same between its locking and released positions.

A drum C includes a base 50 secured to shaft 14 and having a peripheral wall 52 secured thereto coaxially with shaft 14. A flange 54 on the free end of peripheral wall 52 opposite from base 50 extends substantially radially of the longitudinal axis of shaft 14 and has a circumferential friction pad 56 suitably bonded thereto to define a friction drive means having a friction drive surface lying in a plane extending perpendicular to the longitudinal axis of shaft 14.

Shaft 14 has a terminal end 60 and carries expandable means D axially outward of terminal end 60 thereof. A conventional metal wheel 64, as for an automobile or similar vehicle, has a tire mounted thereon in a conventional manner and includes a hub having a central circular opening 66 for receiving a sleeve member 68. A substantially conical outer surface 70 and an inwardly stepped cylindrical surface 72 are provided on sleeve 68.

Sleeve 68 is extended through opening 66 in wheel 64 until sleeve outer surface 70 engages the periphery of opening 66. The assembly of wheel and sleeve is then mounted to shaft 14 by sliding sleeve 68 over expandable means D and onto shaft 14 until wheel 64 engages friction drive means 56 or is positioned closely adjacent thereto. Control means 40 is then operated for expanding expandable means D radially outwardly into locking engagement with sleeve 68 and then moving expandable means D to the left in FIG. 1 for firmly engaging wheel 64 with friction drive means 56. The wheel and its tire will then be rotatably driven with shaft 14 through drum C and friction drive means 56.

Figure 2:
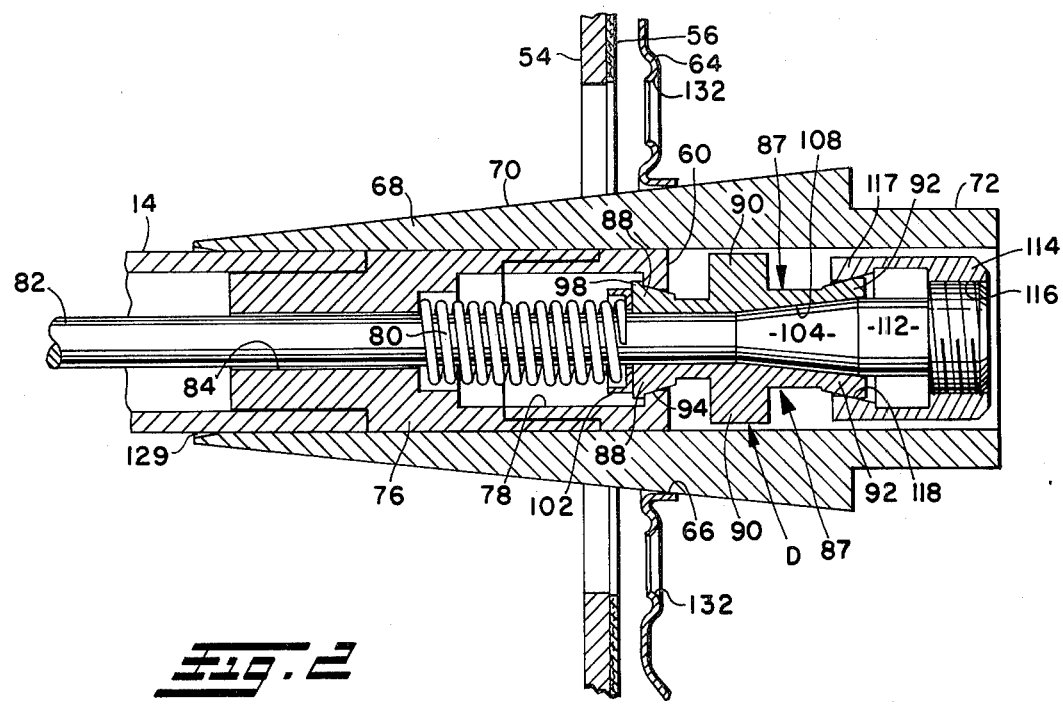
FIG. 2 is a cross-sectional elevational view of the locking mechanism in a released position.

As best shown in FIG. 2, a plug member 76 secured within the open outer end of hollow shaft 14 actually becomes a part of shaft 14 and defines shaft terminal end 60. The cylindrical outer surface of plug member 76 forms a continuation of the outer surface of shaft 14. Plug member 76 has a spring cavity 78 receiving yieldable biasing means in the form of a coil spring 80 which surrounds an elongated rod 82 extending through shaft 14. Plug member 76 has a bore 84 coincidental with the longitudinal axis of shaft 14 and reciprocatingly receives rod 82. Another plug member having a similar bore is provided in the opposite end of shaft 14 for reciprocatingly guiding rod 82 at the other end of the shaft.

Expandable means D includes a pair of opposed individual locking segments 87 having inner end portions 88, intermediate locking portions 90 and outer end portions 88, intermediate locking portions 90 and outer end portions 92. The outer surfaces of intermediate portions 90 may be knurled or otherwise roughened to provide better gripping action. Inner end portions 88 extend through a somewhat restricted central opening in shaft terminal end 60 into spring cavity 78. Cooperating cam surfaces 94 are provided on inner end portions 88 and the periphery of the opening through shaft terminal end 60. These cam surfaces generally lie on the surface of a cone and slope outwardly from right to left in FIG. 2 so that axial movement of segments 87 to the right in FIG. 2 causes radial inward movement of the segments. Axial movement of expandable means D to the left in FIG. 2 relative to shaft 14 allows radial outward expansion of segments 87. Flanges 98 on segments 87 are biased against one end of spring cavity 78 adjacent terminal end 60 by coil spring 80 which bears against a spring cup 102 at one end and against the bottom of cavity 78 at its other end. Thus, the yieldable biasing means defined by coil spring 80 normally biases expandable means D axially outwardly relative to shaft terminal end 60 and this biasing action also produces cooperation between cam surfaces 94 to move expandable means D radially inwardly to a contracted or released position. For this reason, cooperating cam surfaces 94 define cooperating contracting means for positively contracting segments 87 forming expandable means D.

Rod 82 includes expanding means 104 located axially outwardly of shaft terminal end 60 within expandable means D. Expanding means 104 comprises a portion in the shape of a truncated cone to cooperate with correspondingly shaped internal surfaces on segments 87, and these cooperating cam surfaces are generally indicated by numeral 108. Cooperating cam surfaces 108 slope inwardly toward the axis of shaft 14 in a direction from right to left in FIG. 2. A cylindrical outer portion 112 of rod 82 threadably receives a cap member 114 by cooperation of threads 116. Cap member 114 has a cylindrical flange 117 overlying outer end portions 92 of segments 87 forming expandable means D. Cooperating cam surfaces 118 on flange 117 and outer end portions 92 are sloped so that movement of end portions 92 and flange 117 away from one another contracts expandable means D, while movement of same toward one another allows expansion of expandable means D. Therefore, cooperating cam surfaces 118 also define contracting means for positively contracting expandable means D and holding same in a contracted released position. In the arrangement shown and described, shaft 14 and expanding means 104 may be considered as structures, and cooperating contracting means is formed between expandable means D and at least one of these structures in the form of cooperating cam surfaces 94 or 118.

FIGS. 5 and 6 show yoke 22 connected by pins 120 with collar 122 of bearing assembly B. Collar 122 has an inwardly extending flange 124 at one end and a circumferential groove adjacent its opposite end for receiving a snap ring 126 to hold same to the outer race 128 of a ball bearing assembly having an inner race 130 held against a shoulder 132 on rod 82 by a bolt and washer assembly 134. This allows rod 82 to rotate with shaft 14 when the locking mechanism is locked to a sleeve which holds a wheel in engagement with the friction drive means on drum C of FIG. 1.

FIG. 2 shows the arrangement of the locking mechanism right after a wheel is assembled to a sleeve 68 which is then positioned over expandable means D and shaft 14. Sleeve 68 has an inwardly tapering end portion shown at 129 for ease in placing sleeve 68 over expandable means D and shaft 14. The outer surfaces of intermediate portions 90 on segments 87 forming expandable means D, and the outer surfaces of cap 114, are located slightly radially inwardly of the outer surface of shaft 14. The inner diameter of sleeve 68 is such as to be a relatively close sliding fit on shaft 14. The openings shown at 132 in wheel 64 are simply the conventional circumferentially-spaced holes for receiving lug bolts or studs to mount the wheel on a drum.

Figure 3:
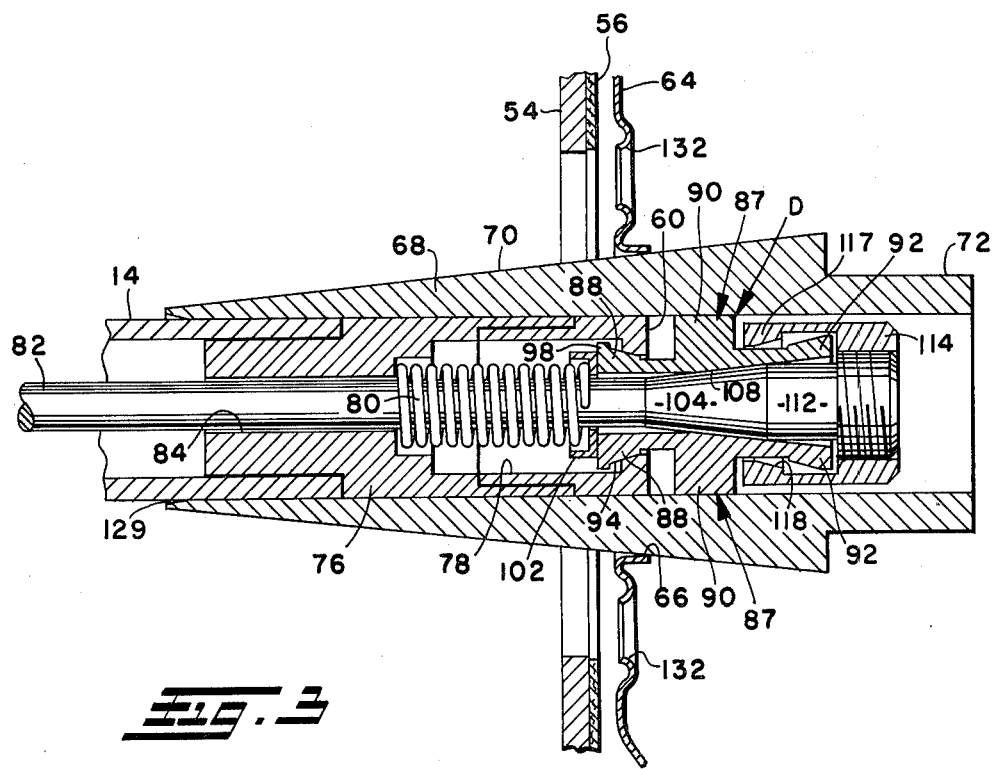
FIG. 3 is a cross-sectional elevational view similar to FIG. 2 and showing the locking mechanism in a locked position.
Figure 4:
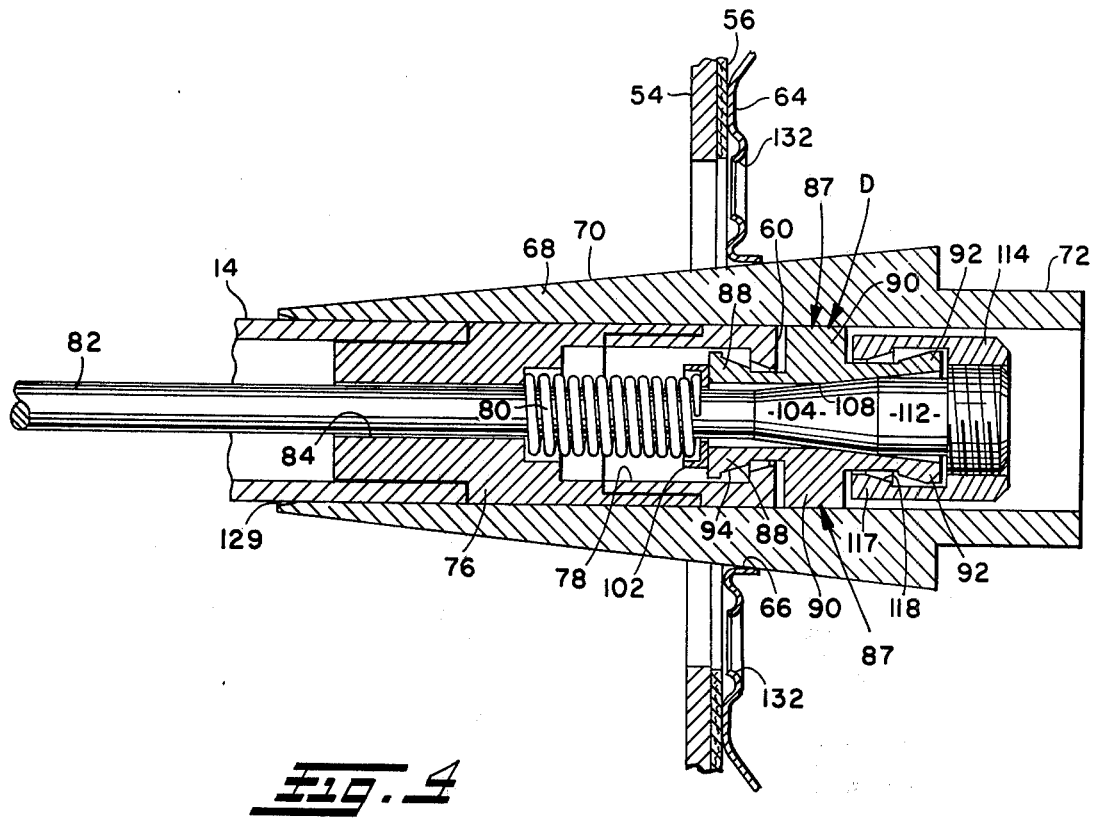
FIG. 4 is a cross-sectional elevational view similar to FIGS. 2 and 3, and showing the locking mechanism in an axially shifted position subsequent to outward locking thereof.

Once the parts are assembled as shown in FIG. 2, control means 40 of FIG. 1 is operated for retracting cylinder rod 32 which causes movement of rod 82 to the left in FIGS. 2–4. This movement of rod 82 causes cooperation between cam surfaces 108 to expand segments 87 of expandable means D radially outwardly so that intermediate portions 90 firmly engage the inner surface of sleeve 68 as shown in FIG. 3. During this movement to the left of the expanding means defined by rod 82 and portion 104 thereof, cam surfaces 94 and 118 move away from one another to allow outward expansion of the segments.

Although wheel 64 is shown spaced slightly from friction drive means 56 in FIG. 3, it will be recognized that there could be engagement at this time. However, further movement of rod 82 to the left will positively move expandable means D to the left against the biasing force of spring 80 until wheel 64 firmly engages friction drive means 56 as shown in FIG. 4. In this position, wheel 64 is firmly clamped against friction drive means 56 for rotation therewith when shaft 14 rotates. The locking mechanism and rod 82 will also rotate due to the firm locking engagement between expandable means D and sleeve 68.

Once the wheel has been marked for balancing, control means 40 of FIG. 1 is operated for positively shifting rod 82 to the right from the position of FIG. 4 back to the position of FIG. 2. The positive movement of rod 82 by operation of pneumatic cylinder 34 provides cooperation between cam surfaces 118 to positively contract segments 87 of expandable means D and also aid in moving expandable means D axially outwardly relative to shaft terminal end 60. Cooperation of the contracting means defined by cam surfaces 94 also helps to insure positive movement of segments 87 radially inwardly to their released position so that sleeve 68 is freely slidable from shaft 14.

Axial movement of rod 82 in one direction relative to shaft 14 and expandable means D causes radial outward expansion of expandable means D to its locking position. Axial movement of rod 82 in an opposite direction provides positive inward movement of expandable means D to its released position. Rod 82 actually moves in a direction tending to move expandable means D toward terminal end 60 of shaft 14 for expanding the expandable means. In the arrangement shown, there are four segments 87 forming expandable means D, with each segment extending over approximately 90°. It will be recognized that a larger number of segments can be used if so desired. When rod 82 moves relative to expandable means D in a direction opposite to the expanding direction, contracting means 118 operates to contract expandable means D. Likewise, movement of expandable means D to the right in FIGS. 2–4 relative to shaft 14 also causes operation of contracting means 94. Sleeve 68 is positioned over shaft 14 so that conical outer surface 70 slopes inwardly in a direction extending along shaft 14 from shaft terminal end 60. Friction drive means 56 is located radially outwardly of shaft 14 closely adjacent shaft terminal end 60.

Although the invention has been shown and described with respect to a preferred embodiment, it is obvious that equivalent alterations and modifications will occur to others skilled in the art upon the reading and understanding of this specification. The present invention includes all such equivalent alterations and modifications insofar as they come within the scope of the appended claims or the equivalents thereof.

Having thus described my invention, I now claim:

1. A locking mechanism comprising: a hollow shaft having a terminal end; expandable means carried by said shaft axially outwardly of said terminal end for movement relative to said shaft radially and axially; and, expanding means carried by said shaft for axial movement relative to said shaft and said expandable means independently of movement of said shaft, said expanding means being movable axially in one direction relative to said shaft and expandable means while said shaft is stationary for outwardly expanding said expandable means, and said expanding means and expandable means being movable in unison in said one direction relative to said shaft while said shaft is stationary for locating a device held by said expandable means in a desired axial position relative to said shaft.

2. The locking mechanism as defined in claim 1 including yieldable biasing means for normally biasing said expandable means in a direction opposite to said one direction.

3. The locking mechanism as defined in claim 1 wherein said expandable means includes a plurality of locking segments and said expanding means includes an elongated rod extending through said shaft, said mechanism further including cooperating means between said segments and rod for radially outwardly expanding said segments upon axial movement of said rod in said one direction relative to said shaft and segments.

4. The locking mechanism as defined in claim 1 wherein said shaft is rotatably driven and is rotatable relative to said expanding means and expandable means, and including friction drive means on said shaft inwardly of said terminal end thereof for rotatably driving a device held to said shaft by said expandable means.

5. A locking mechanism comprising: a hollow shaft having a terminal end; expandable means carried axially outward of said terminal end for expansion to a locking position and contraction to a released position; expanding means non-rotatably movable axially of said shaft for expanding said expandable means; and, contracting means for positively moving and holding said expandable means in said released position upon movement of said expanding means opposite to said one direction, said mechanism further including cooperating cam surfaces between said expandable and expanding means and between said expandable means and said shaft.

6. A wheel balancer or the like including a rotatable hollow shaft having a terminal end, friction drive means carried by said shaft and being located radially outwardly of said shaft adjacent said terminal end for rotatably driving a wheel or the like mounted on said shaft, mounting means carried by said shaft for mounting a wheel or the like thereon, said mounting means including expandable means movable radially outwardly for securing a wheel or the like on said shaft and movable axially for engaging the wheel with said friction drive means.

7. The wheel balancer as defined in claim 6 wherein said mounting means includes a sleeve having a conical outer surface, said sleeve being positionable through an opening in a wheel hub and then being positionable over said shaft and expandable means with said conical surface sloping inwardly in a direction along said shaft from said terminal end thereof.

8. The wheel balancer as defined in claim 6 including contracting means for positively moving said expandable means inwardly and releasably holding same in a contracted position.

9. The wheel balancer as defined in claim 6 wherein said expandable means includes a plurality of segments movable axially and radially relative to said shaft, and an elongated reciprocable rod extending through said shaft and segments for selectively expanding said segments and moving same axially.

10. A locking mechanism comprising: a hollow shaft having a terminal end; expandable means carried by said shaft outwardly of said terminal end for movement relative to said shaft radially and axially; expanding means carried by said shaft for axial movement relative to said shaft and said expandable means, said expanding means being movable axially in one direction relative to said shaft and expandable means for outwardly expanding said expandable means, said expanding means and expandable means being movable in unison in one direction relative to said shaft for locating a device held by said expandable means in a desired axial position relative to said shaft; and, contracting means for positively moving said expandable means radially inwardly upon movement of said expanding means in a direction opposite to said one direction.

11. The locking mechanism as defined in claim 10 wherein said expandable means includes a plurality of locking segments and said expanding means includes an elongated rod extending through said shaft, and said mechanism further including cooperating means between said segments and rod for radially outwardly expanding said segments upon axial movement of said rod in said one direction relative to said shaft and segments.

12. The locking mechanism as defined in claim 11 wherein said contracting means comprises cooperating contracting means between said segments and rod for radially inwardly moving said segments upon axial movement of said rod opposite to said one direction relative to said shaft and segments.

13. The locking mechanism as defined in claim 11 wherein said contracting means comprises cooperating contracting means between said segments and shaft for radially inwardly moving said segments upon axial movement of said segments opposite to said one direction relative to said shaft.

14. The locking mechanism as defined in claim 11 wherein said contracting means comprises cooperating contracting means between said segments and shaft and between said segments and rod for radially inwardly moving said segments upon axial movement of said rod opposite to said one direction relative to said segments and axial movement of said segments opposite to said one direction relative to said shaft.

15. A locking mechanism comprising: a hollow shaft having a terminal end; expandable means carried by said shaft outwardly of said terminal end for movement relative to said shaft radially and axially; expanding means carried by said shaft for axial movement relative to said shaft and said expandable means, said expanding means being movable axially in one direction relative to said shaft and expandable means for outwardly expanding said expandable means, said expanding means and expandable means being movable in unison in said one direction relative to said shaft for locating a device held by said expandable means in a desired axial position relative to said shaft; and, a sleeve receivable over said shaft and expandable means, said sleeve having a substantially conical outer surface which decreases in diameter in a direction along said shaft from said terminal end thereof.

16. A locking mechanism comprising: a hollow shaft having a terminal end and including a spring cavity therein adjacent said terminal end; a plurality of segments having inner end portions extending into said spring cavity and being movable relative to said shaft radially and axially; a spring in said spring cavity yieldably biasing said segments in a direction axially away from said shaft terminal end; an elongated rod extending through said shaft and segments; and, cooperating cams on said segments and rod for radially outwardly expanding said segments upon axial movement of said rod relative to said shaft and segments in one direction tending to move said segments toward said shaft terminal end, and said rod and segments being movable in unison in said one direction relative to said shaft for locating a device held by said segments in a desired axial position relative to said shaft.

17. The locking mechanism as defined in claim 16 wherein said segments have outer end portions and said rod includes an end cap member having a flange surrounding said outer end portions.

* * * * *